March 23, 1926. 1,577,808
M. POSER
OPHTHALMIC TRIAL LENS FRAME
Filed July 11, 1922
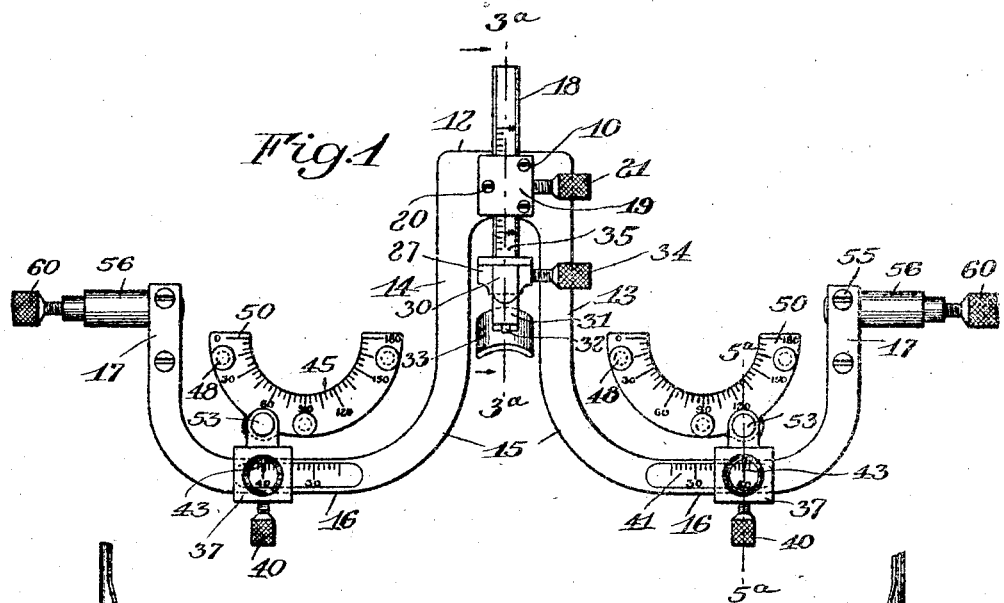
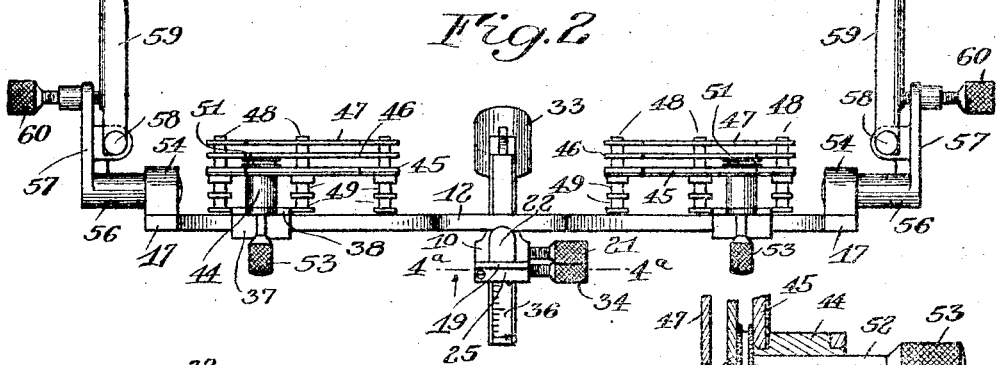
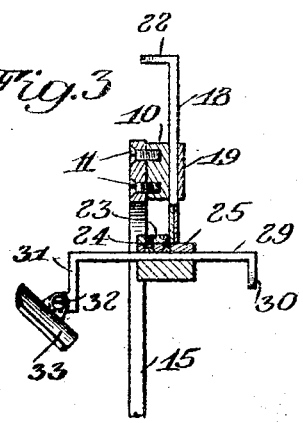
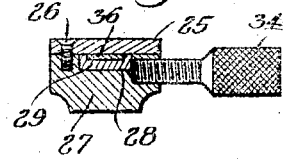
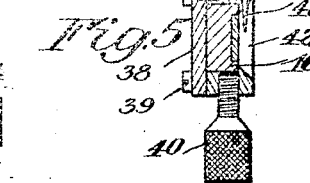
INVENTOR.
Max Poser
BY
his ATTORNEY Patented Mar. 23, 1926.

1,577,808

UNITED STATES PATENT OFFICE.

MAX POSER, OF ROCHESTER, NEW YORK, ASSIGNOR TO BAUSCH & LOMB OPTICAL COMPANY, OF ROCHESTER, NEW YORK, A CORPORATION OF NEW YORK.

OPHTHALMIC TRIAL-LENS FRAME.

Application filed July 11, 1922. Serial No. 574,125.

*To all whom it may concern:*

Be it known that I, MAX POSER, a citizen of the United States, of Rochester, in the county of Monroe and State of New York, have invented certain new and useful Improvements in Ophthalmic Trial-Lens Frames; and I do hereby declare the following to be a full, clear, and exact description of the same, reference being had to the accompanying drawings forming part of this specification, and to the reference numerals marked thereon.

This invention relates to optical apparatus for applying trial lenses to a patient's eyes to test the refraction thereof and obtain data for fitting eye glasses. More specifically the invention relates to trial lens frames provided with means for supporting the same on the patient's head and having pockets for interchangeably receiving the trial lenses, together with suitable indicating means for the various adjustable parts to indicate the desired data for fitting the eye glasses. The chief object of the invention is to provide a trial lens frame of the above description having a simple, light and inexpensive form of construction, the parts of which are conveniently adjustable and provided with suitable indicating means for indicating all of the essential data at one time after making the adjustments necessary to effect the proper refraction of the eyes. To these and other ends the invention consists in certain improvements and combinations of parts, all as will be hereinafter more fully described, the novel features being pointed out in the claims at the end of the specification.

In the drawings:

Figure 1 is a front elevation of a trial lens frame embodying the present invention;

Figure 2 is a top plan view of the same;

Fig. 3 is a sectional elevation on the line 3ª—3ª of Figure 1;

Figure 4 is a sectional elevation on the line 4ª—4ª of Figure 2, and

Figure 5 is a sectional elevation on the line 5ª—5ª of Figure 1.

Similar reference numerals throughout the several views indicate the same parts.

The invention is embodied in the present instance in a trial lens frame constructed of a suitably light metal or alloy and comprising preferably a head portion substantially in the form of a boss or block indicated generally at 10 in which the means for supporting engagement with the patient's nose is adjustably carried. Head portion 10 is fixed as by means of screws 11 (Figure 3) to a member 12 preferably constructed from a single sheet or plate and having formed integrally therewith pending limbs 13 and 14 extending downwardly from the sides of the head portion below the position of the patient's eyes where the limbs are preferably curved outwardly as at 15 to provide substantially horizontal portions 16. The latter at their outer ends are curved upwardly to provide substantially vertical end portions 17 projecting upwardly on a level with the temples of the patient's head for supporting the temple means hereafter described. The horizontally extending portions 16 of the limbs carry the lens pockets as also described in detail hereafter.

Head portion 10 is preferably formed with a groove or channel providing a guideway for a substantially vertical post 18 retained in position by means of a plate 19 secured to the front side of the head portion as by means of screw 20. Post 18 is thus supported for free sliding movement in the head portion which latter is provided at one side with a clamping screw 21 adapted to be screwed against post 18 to clamp the same in vertically adjusted position. The upper end of the post has a horizontally extending finger piece 22 for raising and lowering the same, and its lower end below the head portion is preferably turned rearwardly as at 23 to provide for the attachment to the post as by means of screws 24 of a plate 25 secured as by means of screw 26 to a block 27. The latter is preferably channeled as at 28 to provide a guideway in which is freely slidable a horizontal bar 29, the forward end of which is turned downwardly as at 30 to provide an operating finger piece while its rear end is also turned downwardly as at 31 and has pivotally connected therewith as at 32 a suitable nose piece 33. Block 27 is provided with a screw 34 for clamping engagement with the bar 29 to secure the same in adjusted position.

The means for supporting the frame on the patient's nose may thus be conveniently adjusted vertically by loosening screw 21 and sliding post 18 while the nose piece may be adjusted from front to rear by similarly loosening screw 34 and sliding bar 29. The position of adjustment obtained by these means is indicated by a dial or scale 35 set in a recess or channel formed in the forward face of post 18 and by a similar scale 36 similarly applied to the upper surface of bar 29.

The limbs 13 and 14 are preferably, as already stated, formed integrally with the member 12 carrying the head portion from a single metal plate of sufficient thickness to provide a substantial rigid foundation for the frame. These limbs extend downwardly in spaced relation on either side of the nose piece and their horizontally extending portions 16 serve as supporting and guiding rails for means carrying the lens pockets which are located, as shown, above the horizontal portions within the substantially U-shaped curvature of the limbs and opposite the eye positions.

The supporting means for the lens pockets comprises preferably a carriage or shoe 37 embracing the upper, forward and lower sides of each limb portion 16. A plate 38 is secured to the shoe as by means of screws 39 in rear of limb portion 16 to hold the shoe on the latter for free sliding movement longitudinally thereof. A set screw 40 is provided in the lower side of the shoe for clamping engagement with the limb portion to secure the shoe and lens pocket carried thereby in adjusted position. This adjustment is indicated by providing a scale 41 in a recess or channel in the forward side of limb portion 16 which scale is visible through an opening 42 in the forward side of the shoe which also carries a suitable index or pointer 43.

Plate 38 of the sliding shoe 37 is extended above the latter and carries a rearwardly extending sleeve 44, the forward end of which is reduced in size and fixed in an opening in the plate. The rear end of sleeve 44 is similarly secured to and supports a semiannular plate 45 of the lens pocket. The latter are preferably of the open top variety formed by a plurality of similar parallel plates 45, 46 and 47 fixed in spaced relation with each other to provide pockets therebetween by studs 48 which also extend forwardly of the pocket and are grooved as at 49 to provide additional lens supporting means. The forward side of plate 45 is provided with a scale 50 for indicating the angular adjustment of the lens axis and such angular adjustment of the lens is provided for in a knurled roller 51 located at the periphery of one of the pockets and fixed on the rear end of a spindle 52 having a finger piece 53 for rotating the same. It is to be noted that the construction described not only includes open top pockets affording convenience in the positioning of trial lenses, but the parts are so arranged as to leave the pockets unobstructed above, thus further increasing their accessibility and convenience.

The means for supporting the frame with reference to the temples of the patient's head comprises preferably a block 54 secured as by means of screws 55 on the rear side of each upwardly turned outer end 17 of the limbs. Each block 54 has fixed therein an outwardly extending bracket 56 having a rearwardly extending arm 57 on the inner side of which is pivoted as at 58 a temple bow 59. The ends of arms 57 carry positioning screws 60, the ends of which are adapted to be forced against the temple bows to press the same against the patient's head in the adjusted position of the frame and thereby maintain the latter in such position.

It is apparent from the above description of the construction that the various parts are comparatively simple in form and inexpensive to manufacture and assemble. The parts may be made of a light metal or alloy so that the frame as a whole is light in weight although of substantial dimensions insuring the necessary strength and rigidity. The invention therefore provides a simple, efficient and inexpensive form of frame having all the essential adjustments which may be quickly and conveniently made, including the interchange of the trial lenses, and the data of the various adjustments is clearly shown by effective indicating means so that when once the adjustments have been made and the eyes of the patient properly refracted the data for fitting eyeglasses may all be read at one time from such indicating means.

I claim as my invention:

1. An ophthalmic trial lens frame comprising a central head portion provided with adjustable means for supporting engagement with a patient's head, limbs carried by said head portion having substantially horizontal portions extending outwardly below the positions of the patient's eyes, a carriage mounted on each of said horizontal portions and adjustable inwardly and outwardly thereon one independent of another, members extending laterally from the carriages, lens pockets supported by each of said members above and at one side of said horizontal portions and temple means carried adjacent the outer ends of said limbs.

2. An ophthalmic trial lens frame comprising a central head portion provided with means for supporting engagement with a patient's head, limbs depending from said head portion having horizontal portions extending outwardly below the positions of the patient's eyes, a carriage mounted on each of said horizontal portions for back and forth adjustment one independent of another, lens pocket supports extending laterally from said carriages, a plurality of pockets carried by each of said supports, lens adjusting means for certain of said pockets including operating devices extending through said supports, and temple means connected with said horizontal portions.

3. An ophthalmic trial lens frame comprising a central head portion provided with adjustable means for supporting engagement with a patient's head, a member fixed to said head portion having depending limbs including substantially horizontal portions extending outwardly below the eye positions, independently adjustable carriages mounted upon said horizontal portions, lens pockets supported above said horizontal portions by each of said carriages, means for effecting angular adjustment of the lenses in certain of said pockets including operating spindles mounted for rotation upon the carriages, and temple means connected with said limbs.

4. An ophthalmic trial lens frame comprising a central head portion provided with guide means, a substantially vertical post slidable freely on said guide means, clamping means for securing the post in adjusted position on the head portion, guide means adjacent the bottom of said post, a substantially horizontal bar slidable freely on said post guide means, clamping means for securing said bar in adjusted position on said post, a member fixed to said head portion having depending limbs, including substantially horizontal portions extending outwardly below the eye positions and upwardly turned end portions, independently adjustable carriages slidable upon said horizontal portions, lens pockets open at their tops and supported above said horizontal limb portions by said carriages, cooperating indicating means on said horizontal limb portions and carriages, and temple means on said limb end portions.

MAX POSER.